(12) United States Patent
Okumura et al.

(10) Patent No.: US 6,496,003 B1
(45) Date of Patent: Dec. 17, 2002

(54) MAGNETIC DISPLACEMENT DETECTING DEVICE HAVING LINEAR CHANGING MAGNETIC FIELD OVER THE LENGTH OF THE SERVICE

(76) Inventors: Hirofumi Okumura, c/o Alps Electric Co., Ltd., 1-7 Yukigaya, Otsuka-cho, Ota-ku, Tokyo (JP); Ichirou Tokunaga, c/o Alps Electronic Co., Ltd., 1-7 Yukigaya, Otsuka-cho, Ota-ku, Tokyo (JP)

( * ) Notice: Subject to any disclaimer, the term of this patent is extended or adjusted under 35 U.S.C. 154(b) by 0 days.

(21) Appl. No.: 09/635,347

(22) Filed: Aug. 9, 2000

(30) Foreign Application Priority Data

Aug. 9, 1999 (JP) ............................................. 11-225185

(51) Int. Cl.[7] .............................. G01B 7/14; G01B 7/30; G01B 5/12; G01B 15/02
(52) U.S. Cl. ............................. 324/207.24; 324/207.2; 324/207.23; 324/207.25; 180/400
(58) Field of Search ....................... 324/207.2–207.24, 324/207.26, 251, 252; 338/32 R, 32 H; 92/5 R; 200/61.45 R; 180/400; 335/205, 302

(56) References Cited

U.S. PATENT DOCUMENTS 3,473,109 A  * 10/1969  Maaz et al. ............... 324/207.2
4,107,604 A  *  8/1978  Bernier ..................... 324/207.2
4,896,584 A  *  1/1990  Stoll et al. ..................... 92/5 R
5,159,268 A  * 10/1992  Wu .......................... 324/207.2
5,493,216 A  *  2/1996  Asa .......................... 324/207.2
5,574,365 A  * 11/1996  Oyama et al. ......... 324/207.24
5,929,631 A  *  7/1999  Striker et al. .......... 324/207.21
6,215,299 B1 *  4/2001  Reynolds et al. ........ 324/207.2
6,218,828 B1 *  4/2001  Bates et al. .............. 324/207.2

FOREIGN PATENT DOCUMENTS

| | | | | |
|---|---|---|---|---|
| JP | 54-103372 | * | 8/1979 | ............ 324/207.22 |
| JP | 61-134601 | * | 6/1986 | ............ 324/207.22 |
| JP | 62-229002 | | 7/1987 | |
| JP | 2001-91298 | * | 4/2001 | |

* cited by examiner

Primary Examiner—Gerard R. Strecker
(74) Attorney, Agent, or Firm—Brinks Hofer Gilson & Lione

(57) ABSTRACT

A magnet is provided on a detection member that moves on a straight line. A Hall element serving as a magneto-electric element is provided on a fixed member that opposes the magnet. A surface of the magnet that opposes the Hall element is formed into a radius or trapezoidal shape. With this arrangement, linear outputs can be obtained at any rotational angles even when a rotator rotates a plurality of times.

18 Claims, 7 Drawing Sheets

MAGNETIC DISPLACEMENT DETECTING DEVICE HAVING LINEAR CHANGING MAGNETIC FIELD OVER THE LENGTH OF THE SERVICE

BACKGROUND OF THE INVENTION

1. Field of the Invention

The present invention relates to a magnetic displacement detecting device coupled to a steering shaft of, for example, an automobile, to detect a steering angle of a steering wheel and, more particularly, to a magnetic displacement detecting device that permits highly accurate detection of a moving object that linearly moves.

2. Description of the Related Art

FIG. 9 is a top plan view showing a conventional magnetic displacement detecting device 40. The magnetic displacement detecting device 40 has a detection member 41, a fixed member 42, a magnet 43, and a Hall element 44 serving as a magnetic detecting means.

The detection member 41 is supported by a rod-shaped guiding member 45, and the detection member 41 linearly moves along the guiding member 45. The detection member 41 is provided with the magnet 43 having a hexahedron shape, which has been magnetized so that one end in a traveling direction of the detection member 41 carries the north pole, while the other end carries the south pole. The fixed member 42 is secured to a surface of a case (not shown) that opposes the magnet 43. The Hall element 44 is provided on surface of the fixed member 42 that opposes the magnet 43. The Hall element 44 detects an intensity of a component in a direction of z of a magnetic force emitted from the magnet 43.

For instance, in a magnetic displacement detecting device for detecting a steering angle of a steering wheel, a torque of a rotator that rotates together with the steering wheel is converted into a linear moving force of the detection member 41. The magnet 43 moves together with the detection member 41, opposing the Hall element 44, and a changing rate in the z-direction component of a magnetic field emitted from the magnet 43 at this time is detected through the Hall element 44, thereby allowing a rotational angle of the steering wheel to be known.

In this type of magnetic displacement detecting device 40, the Hall element 44 detects the intensity of a magnetic field in the z-direction, i.e., a direction orthogonal to a traveling direction of the detection member 41. Based on a changing rate in detection values of the magnetic field in the z-direction, a travel amount of the detection member 41 is recognized.

As shown in FIG. 9, however, the surface of the conventional magnet 43 that opposes the Hall element 44 is flat in the traveling direction. Therefore, a changing rate in the intensity of the magnetic field in the z-direction with respect to a traveling distance is relatively large in the vicinity of both ends in the traveling directions of the magnet 43. In contrast, at a central portion of the magnet 43 in the traveling direction, an area wherein a magnetic force line E0 is substantially flat in the traveling direction expands, and a changing rate in the intensity of the magnetic field in the z-direction with respect to the traveling distance of the magnet 43 becomes extremely small.

For the above reason, a changing rate of the intensity of the magnetic field in the z-direction with respect to the traveling distances of the detection member 41 and the magnet 43 becomes nonlinear, making it difficult to accurately grasp the traveling distance of the detection member 41.

To detect the steering angle of the steering wheel mentioned above, the detection member 41 is moved by the rotator that rotates together with the steering wheel. Another rotation detecting means is provided that detects the rotational angle of the rotator with a higher resolution than that of the Hall element 44. In a range wherein the Hall element 44 moves from the center of the magnet 43 to a front or rear end thereof, rough detection of ±720 degrees of the rotator is performed. During the rough detection, more accurate rotational angle of the rotator is detected by the foregoing rotation detecting means. At this time, a further accurate angle is recognized by the rotation detecting means, by using a detection angle based on a detection value supplied from the Hall element 44.

In such a device, if the accuracy of the detection member 41 for detecting the moving distance deteriorates, causing a difference between the rotational angle of the rotator and a detection value, then a reference value used for performing detailed angle detection of the rotator varies. As a result, an error occurs in the detection of the rotational angle of the steering wheel.

SUMMARY OF THE INVENTION

Accordingly, the present invention has been made with a view toward solving the problem described above, and it is an object of the present invention to provide a magnetic displacement detecting device for detecting a relative travel amount as linearly as possible by a magnetic detecting means in a case where a detection member having a magnet and a magnetic detecting means relatively move.

To this end, according to one aspect of the present invention, there is provided a magnetic displacement detecting device having a detection member that linearly moves and a fixed member provided such that it opposes the detection member, one of the detection member or the fixed member being provided with a magnet having a north pole and a south pole in a traveling direction of the detection member, while the other being provided with a magnetic detecting means, and a magnetic force emitted from the magnet being detected by the magnetic detecting means thereby to detect a movement of the detection member, wherein a distance between the magnet and the magnetic detecting means is the smallest in the vicinity of a center of the magnet and increases toward ends of the magnet.

Shaping the magnet so that it bulges at its center toward the magnetic detecting means causes a changing rate of a magnetic field in a direction orthogonal to a traveling direction of the magnet to be linear or nearly linear over a longitudinal full length of the magnet in the traveling direction. With this arrangement, the relative travel distances of the detection member and the magnetic detecting device can be detected with higher accuracy by making use of a changing rate in the magnetic field.

In a preferred form of the present invention, a surface of the magnet that opposes the magnetic detecting means has a radius shape, including a convex surface in addition to a precise radius shape. denoted by H, and the radius of the curved surface is denoted by R, then the magnet preferably has a shape represented by: W=10 to 20, H=1 to 5, and R=20 to 50.

In another preferred form of the present invention, the surface of the magnet that opposes the magnetic detecting means is trapezoidal.

In this case, if a width of the magnet in a direction in which the magnet or the magnetic detecting means travels is denoted by W, a thickness of the magnet in a direction in which the magnet and the magnetic detecting means face each other is denoted by H, a length of cutoffs in the H-direction of tapers at both ends of the trapezoid is denoted by Y, and a length of cutoffs in the W-direction of the tapers is denoted by X, then the magnet preferably has a shape represented by: W=10 to 20, H=1 to 5, X=4.25 to 4.75, and Y=0.4 to 0.6.

In yet another preferred form of the present invention, the detection member is provided with a rotator, and the detection member linearly is operated by a rotational operation of the rotator, and further provided with an additional detecting means for detecting a rotational angle of the rotator with a higher resolution than that of a detection output obtained by the magnet and the magnetic detecting means together.

In this case, by using positional recognition based on a change in a magnetic field intensity detected by the magnetic detecting means as a reference, a detailed rotational angle of the rotator is determined from a detection output from the additional detecting means. Thus, highly accurate positional detection can be achieved by the. detection member and the magnetic detecting means. This prevents variations in a reference value for determining a more detailed rotational angle, permitting highly accurate detection of a rotational angle of the rotator.

BRIEF DESCRIPTION OF THE DRAWINGS

FIG. 10A illustrates a magnet with a stepped shape while

DESCRIPTION OF THE PREFERRED EMBODIMENTS

Figure 1:
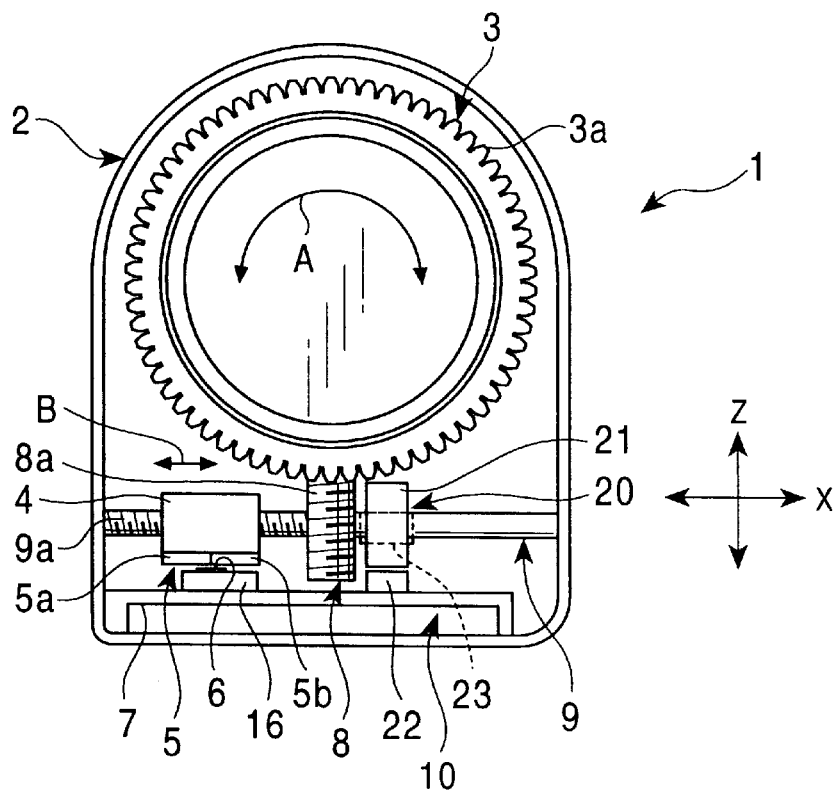
FIG. 1 is a top plan view showing an internal structure of an angle sensor provided with a magnetic displacement detecting device in accordance with the present invention.
Figure 2:
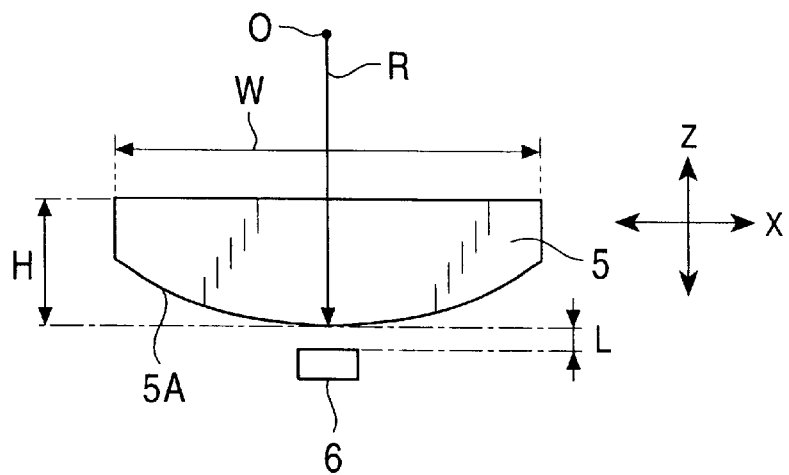
FIG. 2 is a top plan view showing a shape of a magnet used in the magnetic displacement detecting device in accordance with the present invention.
Figure 3:
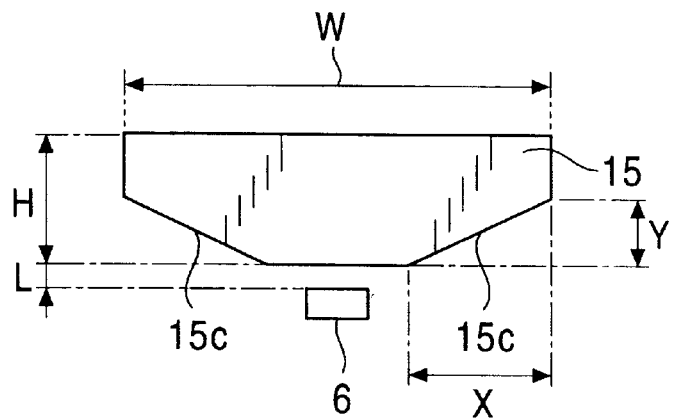
FIG. 3 is a top plan view showing an example of a modified shape of the magnet shown in FIG. 2.
Figure 4:
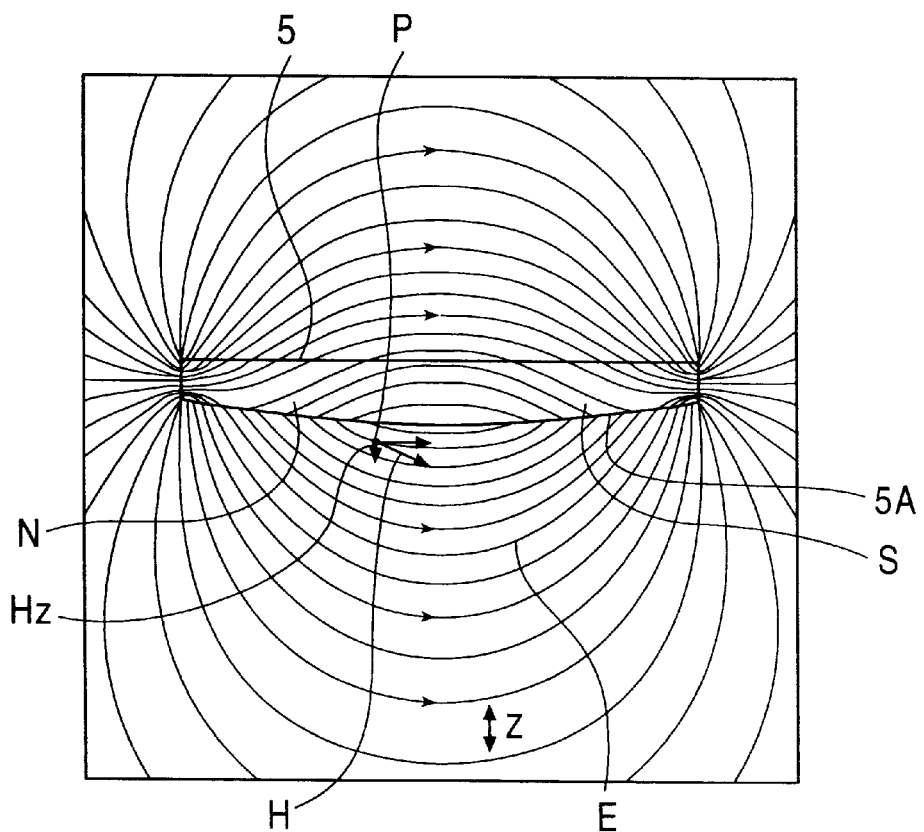
FIG. 4 is a schematic diagram showing virtual magnetic force lines emitted from the magnet shown in FIG. 2.

The present invention will now be described with reference to FIG. 1 through FIG. 8. FIG. 1 is a top plan view showing an internal structure of an angle sensor in which a magnetic displacement detecting device in accordance with the present invention has been installed, FIG. 2 is a top plan view showing a shape of a magnet used in the magnetic displacement detecting device in accordance with the present invention, FIG. 3 is a top plan view showing an example of a modified shape of the magnet, and FIG. 4 is a schematic diagram virtually showing magnetic force lines emitted from the magnet shown in FIG. 2. The following will describe an angle sensor capable of detecting a steering angle of an automotive steering wheel with high accuracy.

An angle sensor 1 shown in FIG. 1 includes a magnetic displacement detecting device 10 housed in a case 2 composed of a synthetic resin material, such as a plastic material. The magnetic displacement detecting device 10 has a detection member 4, a magnet 5, a Hall element (magnetic detecting means) 6, and a fixed member 7. The magnetic displacement detecting device 10 is further provided with a rotator 3. A rotational operation of the rotator 3 is converted into a linear operation of the detection member 4, and a displacement of the linear operation at that time is detected by the Hall element 6.

The rotator 3, which is cylindrical, is formed of a synthetic resin material or the like, and rotatably supported with respect to the case 2. A plurality of helical gears 3a are formed over an entire peripheral surface of the rotator 3. The rotator 3 is further provided with a discoid reduction gear 8 made of a synthetic resin material.

The reduction gear 8 has a D-shaped through hole (not shown) at a central portion of the discoid body, and is provided with a plurality of helical gears 8a formed on an entire peripheral surface. The helical gears 8a mesh with the helical gears 3a. A rod-shaped rotating shaft 9 is rotatably installed to the reduction gear 8.

A section of a portion of the rotating shaft 9 on which the reduction gear 8 is mounted is D-shaped. The D-shaped portion of the reduction gear 8 is fitted with the D-shaped portion of the rotating shaft 9, and fixed in the vicinity of the center of the rotating shaft 9.

The rotating shaft 9 is formed of a metal material, such as brass or aluminum, has a spiral thread groove 9a formed from a central portion to one end, and is rotatably supported with respect to the case 2. The rotating shaft 9 is provided with the detection member 4.

The detection member 4 has a through hole drilled from one end surface to the other end surface in the traveling direction. The through hole has, on its inner peripheral surface, a thread (not shown) that engages the thread groove 9a formed in the rotating shaft 9. The magnet 5 is mounted on a bottom surface of the detection member 4 by insert molding or the like. The detection member 4 is guided in the case 2 such that it linearly moves in the x-direction. Hence, when the rotator 3 rotates and the reduction gear 8 and the rotating shaft 9 rotate, the detection member 4 and the magnet 5 reciprocate in a direction indicated by an arrow B or in the x-direction.

The magnet 5 is formed of a magnetic material, such as ferrite, and shaped so that it is lengthy in traveling directions. One end of the magnet 5 in the traveling directions has been magnetized to a north pole 5a, while the other end thereof has been magnetized to a south pole 5b. In other words, the magnet 5 has been magnetized to be polarized so that one end thereof in the x-direction carries the north pole, while the other end thereof carries the south pole. The fixed member 7 is provided, opposing the magnet 5, and the fixed member 7 is secured to the case 2.

The fixed member 7 is formed of a plane insulating board, a desired conductive pattern being formed on the insulating board. Electric components, including resistors and capacitors (not shown), that constitute an electric circuit are mounted on the conductive pattern. The Hall element 6 is provided on the fixed member 7 at a side opposing the magnet 5.

The Hall element 6, which is a magneto-electric element for converting magnetic energy into electric energy, is retained by a holder 16 supported by the fixed member 7. The Hall element 6 detects a magnetic field intensity of a z-axis component of a magnetic field obtained from the magnet 5.

As shown in FIG. 2, the magnet 5 is shaped so that a section thereof cut by an x-z plane or a plane observed from a side is radius-shaped. To be more accurate, the section is radius-shaped or convex on one lengthwise side of the rectangular shape. The radius shape may have a precise arc surface or a convex surface approximating to an arc surface. In this case, if a width of the magnet 5 in the x-direction is denoted by W, and a z-direction is denoted as a thickness H, and a radius of the curved surface is denoted by R, then the magnet preferably has a shape represented by: W=10 to 20 mm, H=1 to 5 mm, and R=20 to 50 mm. At this time, a distance (L) between the magnet 5 and the Hall element 6 serving as the magnetic detecting means is fixed to 0.8 mm.

Thus, the magnet 5 emitting virtual lines of magnetic force E shown in FIG. 4 is obtained. More specifically, the magnet 5 radiates lines of magnetic force from the north pole to the south pole. As illustrated, the lines of magnetic force E radiated from the magnet 5 having the shape shown in FIG. 4 are emitted not only from both ends of the magnet 5 but from the curved surface portion 5A of the magnet 5 also. At a point P on the lines of magnetic force E in the vicinity of the center of the magnet 5, if. a magnitude and a direction of a magnetic force in a tangential direction of the lines of magnetic forces E are represented by a magnetic field H, then a vector component of the magnetic field H in the z-direction can be represented by a magnetic field Hz. Thus, in the vicinity of the center of the magnet 5, a magnetic force having a sufficiently large vector component can be output to the Hall element 6 or in the z-direction.

As described above, by forming the one surface of the magnet 5 that opposes the Hall element 6 to have the radius shape, the vector components in the z-direction of the magnetic forces, which have hardly been emitted from the conventional magnet having the hexahedral shape, can be emitted in the vicinity of the center of the magnet 5. Furthermore, a density of lines of magnetic force is lower than that in the conventional magnet having the hexahedral shape in which the lines of magnetic force becomes denser toward ends of the magnet 5. Hence, a sudden changing rate in an output of the Hall element 6 no longer occurs. As a result, in the magnet 5 having the shape set forth above, a changing rate of the vector component Hz of a magnetic field in the z-direction with respect to a scanning distance or a moving distance can be made more linear than in the past when the Hall element 6 is scanned from one end to the other end of the magnet 5.

FIG. 3 shows a modification example of the shape of the magnet 5. A section of a magnet 15 cut by a plane of an x-z of the magnet may be trapezoidal as illustrated.

The magnet 15 has slant or tapered surfaces 15c and 15c formed by equally cutting off both corners of the hexahedral magnet that face the Hall element 6 as illustrated. In this case, if a width of the magnet 15 in the x-direction is denoted by W, and a z-direction is denoted as a thickness H, a cutoff length in an x-axis direction of the slant surfaces 15c is denoted by X, and a cutoff length in the direction of the slant surfaces 15c is denoted by Y, then the magnet 15 preferably has a shape represented by: W=10 to 20 mm, H=1 to 5 mm, X=4.25 to 4.75 mm, and Y=0.4 to 0.6 mm. With this arrangement, linearity of the vector component Hz in the z-direction of the magnetic force with respect to the scanning distance or the moving distance when the Hall element 6 is scanned can be improved.

Figure 7:
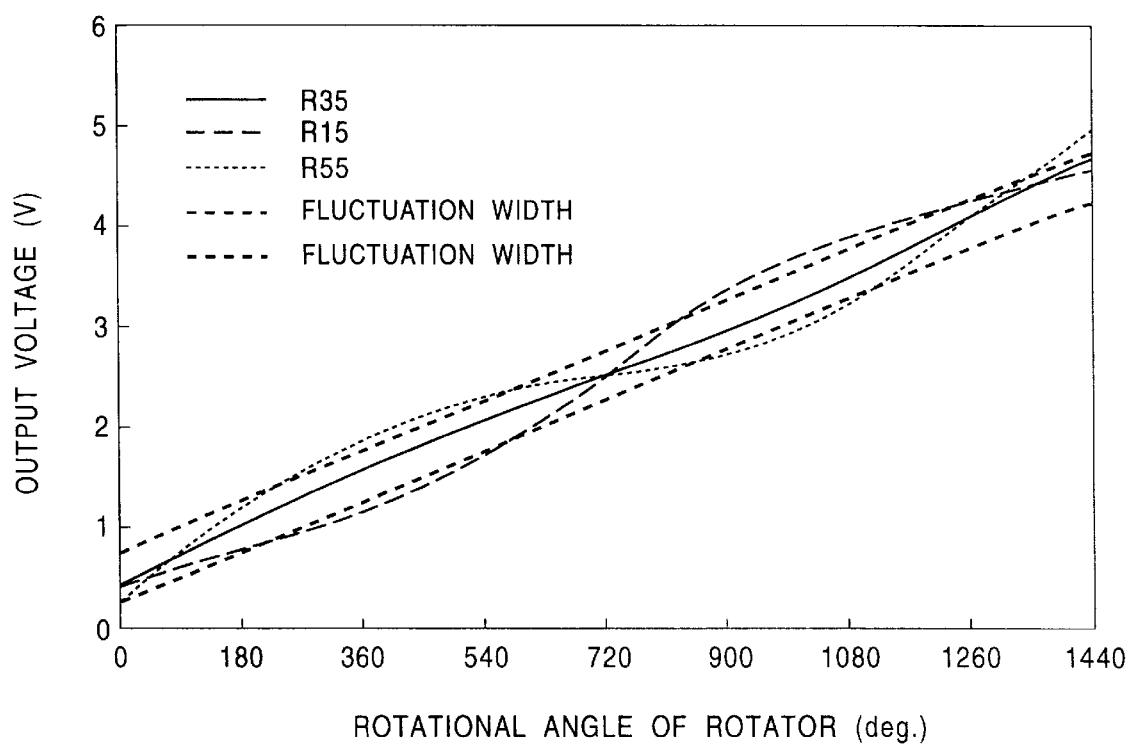
FIG. 7 is a line map illustrating a changing rate in magnetic detection outputs in relation to rotational angles of a rotator when an opposing surface of the magnet is formed to have a radius shape.

FIG. 7 shows a changing rate in detected intensity of the vector component Hz, with the Hall element 6 in relation to a rotational angle of the rotator 3 when the opposing surface has the radius shape as shown in FIG. 2. An established value in this case is W=14 mm, and R is changed. In the case shown in FIG. 7, a distance between the magnetic detecting means and a distal end of the magnet that is adjacent the magnetic detecting means is fixed to 0.8 mm (the same applies also to FIG. 8).

As a result, when R is set to 55 mm, fluctuation can be controlled to a predetermined fluctuation range when the rotator is at any angle from 0 degrees to 1440 degrees. The predetermined fluctuation range means a permissible range in achieving commercialization, namely, a range of ±5% in relation to output changes from 0 to 1440 degrees in FIG. 7 according to this embodiment. The fluctuation significantly deviates from the above fluctuation range if R is 15 mm, which is smaller than the above predetermined range, or 55 mm, which is larger than the above predetermined range. By using the means described above, a preferable value of R is determined. Preferably, the value of R ranges from 20 to 50 mm, and the thickness H in this case ranges from 1 to 5 mm.

Figure 8:
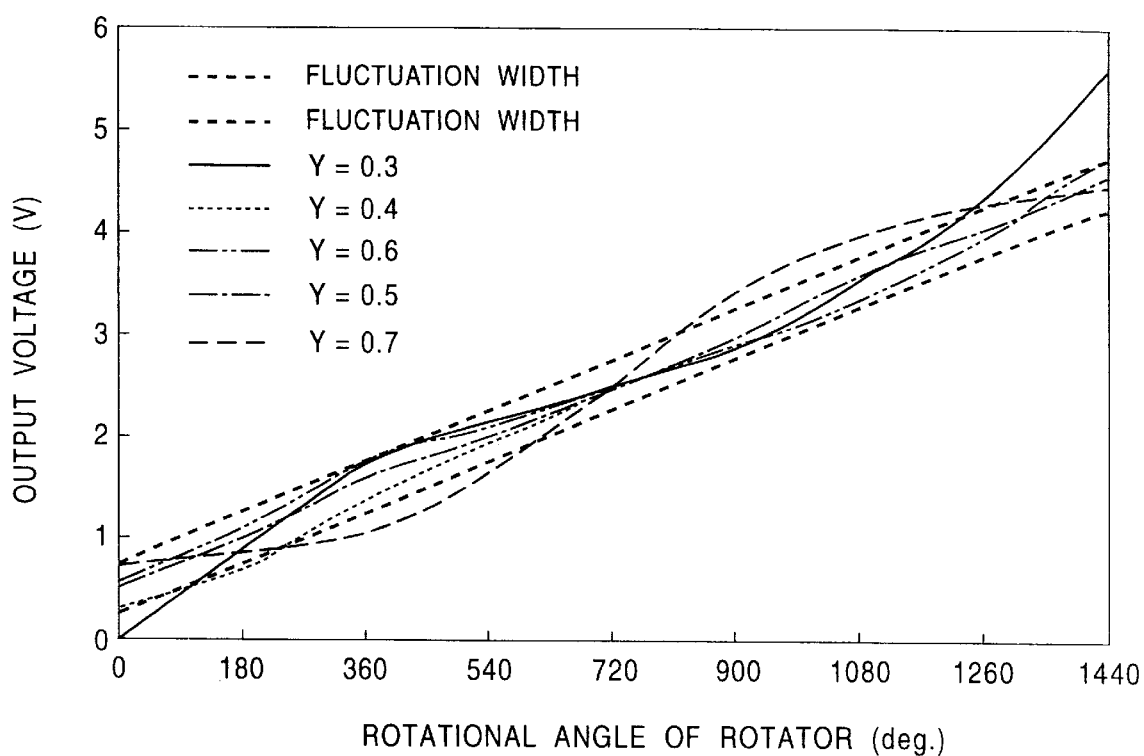
FIG. 8 is a line map illustrating a changing rate in magnetic detection outputs in relation to rotational angles of a rotator when an opposing surface of the magnet is formed to have a trapezoidal shape.
Figure 9:
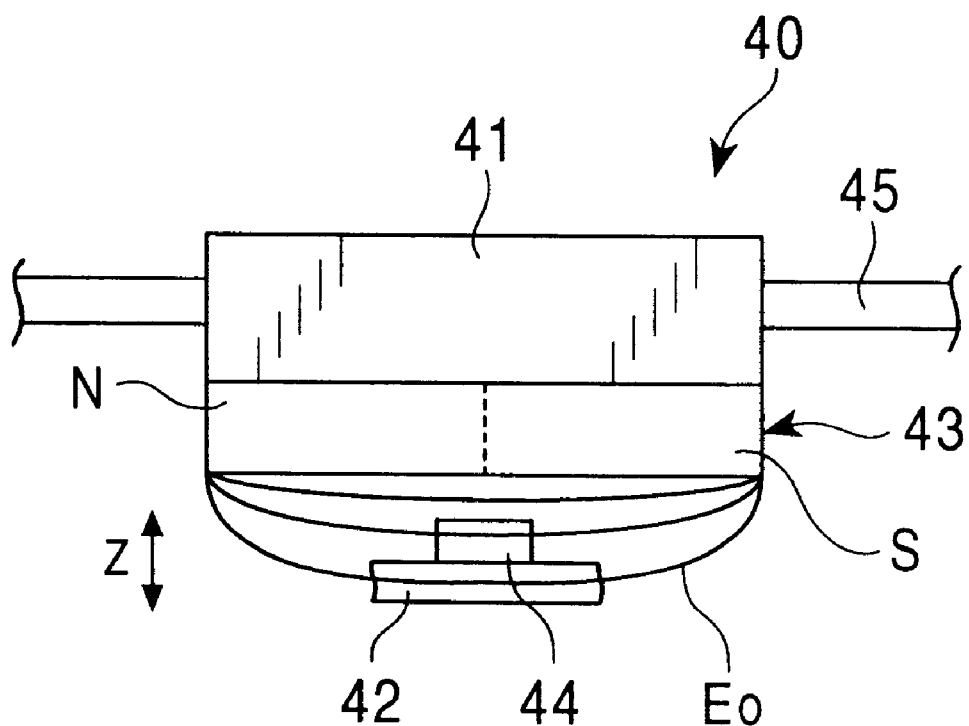
FIG. 9 is a top plan view showing a conventional magnetic displacement detecting device.

FIG. 8 shows a changing rate in detected intensity of the vector component Hz, with the Hall element 6 in relation to a rotational angle of the rotator 3 when the opposing surface of the magnet is trapezoidal as shown in FIG. 3. Established values in this case are W=12 mm, H=1.5 mm, and X=3 mm, and Y is changed. As a result, when Y is in a range of 0.4 to 0.6 mm, fluctuation in intensity can be controlled approximately to a predetermined fluctuation range (the range of ±5% in relation to output changes from 0 to 1440 degrees as set forth above) without great deviation from the predetermined range when the rotator is at any angle from 0 to 1440 degrees. If the value of Y is smaller than 0.4 mm or larger than 0.6 mm, then an output voltage significantly deviates from the fluctuation range. A preferable value of Y is determined as described above, and a conclusion is reached that the value of Y preferably ranges from 0.4 to 0.6 mm. If the value of Y is fixed, while the value of X is changed, it is concluded that X preferably ranges from 4.25 to 4.75 mm. Regardless of whether the value of Y or X is fixed, it is preferable to set W to 10 to 20 mm, and H to 1 to 5 mm.

Furthermore, the angle sensor 1 is provided with another magnetic rotation detecting device 20, as shown in FIG. 1.

The rotation detecting device 20 is formed by a second magnet 21, a second Hall element 22, and a third Hall element 23. The second magnet 21, which is annular, is formed of a magnetic material, such as ferrite, as in the case of the foregoing magnet 5 or 15. An outer peripheral surface of the second magnet 21 has been magnetized such that a north pole and a south pole pass by the Hall element 22 once or twice while the magnet 21 rotates once. The second magnet 21 is secured to the rotating shaft 9 in the vicinity of the reduction gear 8.

The arrangement described above enables the magnetic displacement detecting device 10 to detect an approximate rotational angle of the rotator 3, and the rotation detecting device 20 to detect a more accurate rotational angle of the rotator 3.

A procedure for assembling the angle sensor 1 will now be described.

As shown in FIG. 1, the Hall element 6, the second Hall element 22, and the third Hall element 23 are mounted on the fixed member 7 provided in the case 2. At this time, the third Hall element 23 is installed to the second magnet 21 so that it is positioned at an angle of 90 degrees relative to the second Hall element 22. Then, the reduction gear 8 is fitted to the rotating shaft 9, and the annular second magnet 21 is also fitted thereto. The detection member 4 is screwed onto the rotating shaft 9 on a side opposite from the side where the second magnet 21 of the reduction gear 8 is installed, and the detection member 4 is supported by the rotating shaft 9 so that the magnet 5 is positioned at a central portion of the thread groove 9a. The rotating shaft 9 is rotatably supported in the case 2. Then, the rotor 3 is placed in the case 2 in such a manner that the helical gears 3a of the rotor 3 mesh with the helical gears 8a of the reduction gear 8, and the case 2 is covered by a covering member (not shown). The third Hall element 23 may alternatively be provided on the covering member.

An operation of the angle sensor 1 will now be described. The rotator 3 is adapted to rotate twice clockwise and counterclockwise, respectively, from a neutral state. The number of rotations, however, is not limited to two. As the rotator 3 rotates, the reduction gear 8 and the rotating shaft 9 rotate together. The reduction gear 8 rotates four times while the rotator 3 rotates once.

When the rotator 3 is rotated twice counterclockwise from a neutral state, the rotational operation of the rotator 3 causes the reduction gear 8 to rotate in one direction, and the rotating shaft 9 rotates in one direction together with the reduction gear 8. The rotating shaft 9 rotates with the thread groove 9a meshed with a thread (not shown) of the detection member 4, thereby converting the rotational motion of the rotating shaft 9 into a linear motion of the detection member 4. The detection member 4 moves, together with the magnet 5, along the rotating shaft 9 in a direction indicated by the arrow B and reaches one end of the thread groove 9a. When the rotator 3 is rotated twice clockwise from the neutral state, the reduction gear 8 and the rotating shaft 9 rotate in the opposite direction from the foregoing direction. This causes the detection member 4 to move in the opposite direction from the foregoing direction, and reach a center of the thread groove 9a. When the rotator 3 is further rotated twice clockwise, the detection member 4 reaches the other end of the thread groove 9a.

A procedure for detecting a rotational angle of the rotator 3 will now be described.

In the angle sensor 1 assembled as set forth above, the magnet 5 and the Hall element 6 constitute a first detecting means. The second magnet 21, the second Hall element 22, and the third Hall element 23 constitute a second detecting means and a third detecting means.

In the first detecting means, when a steering wheel rotates, the Hall element 6 detects a movement of the magnet 5 and generates a first detection signal 31 that gradually increases or decreases. At this time, the first detection signal 31 linearly changes from 0.5 volts (V) to 4.5 V while the steering wheel rotates four times. This makes it possible to detect a rough or approximate rotational angle of the steering wheel, which rotates with the rotator 3 as one piece, from a neutral position and a rotational direction thereof.

Figure 5:
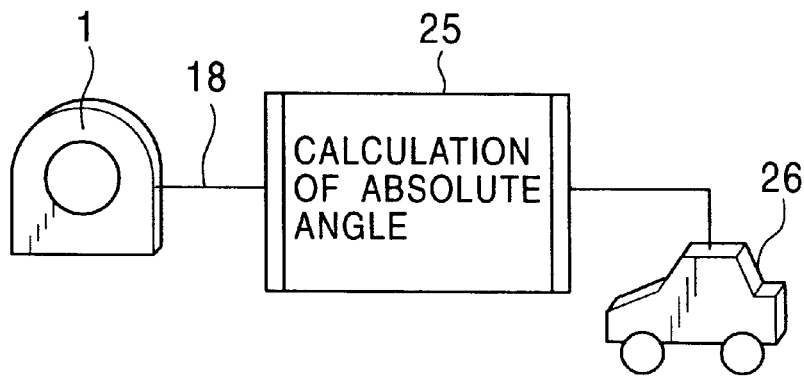
FIG. 5 is a schematic diagram showing the magnetic displacement detecting device in accordance with the present invention in service.

A microcomputer 25 shown in FIG. 5 serves as a means for calculating a rotational angle of the steering wheel. The angle sensor 1 is mounted on an automobile, and connected to a control device 26 of an automotive suspension, automatic transmission, etc. The microcomputer 25 receives first, second, and third detection signals 31, 32, and 33 as input signals via a cable 18, and superimpose these signals to detect an approximate rotational angle from the neutral position and a rotational direction of the steering wheel by referring to the first detection signal 31, and to detect a detailed or accurate rotational angle of the steering wheel by referring to the second detection signal 32 and the third detection signal 33.

Figure 6:
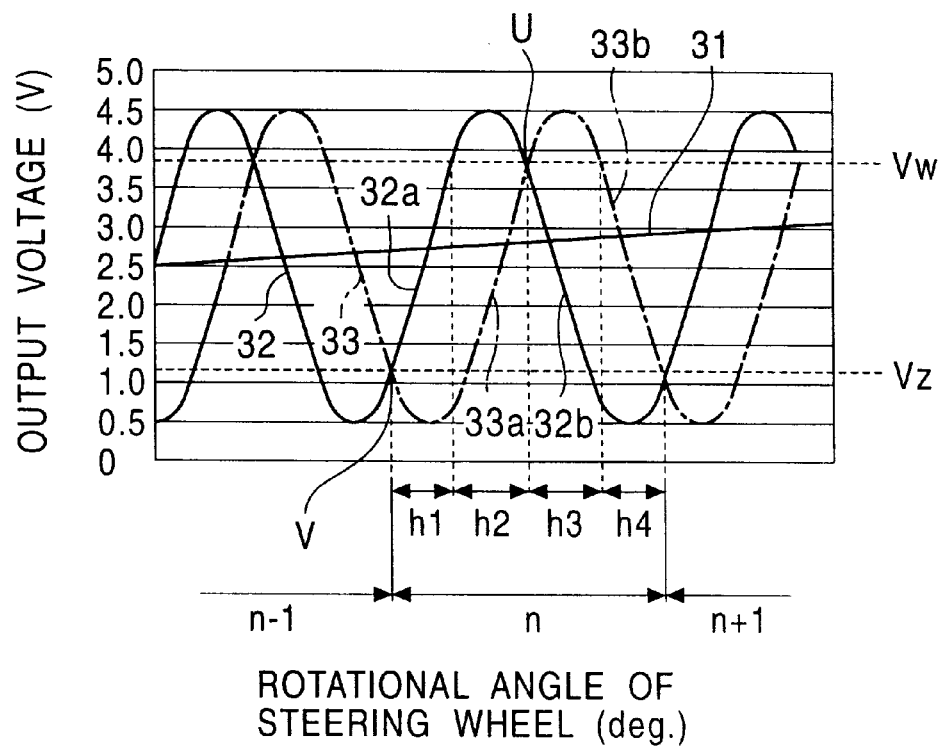
FIG. 6 is an output characteristic chart illustrating waveforms of first, second, and third detection signals.

More specifically, based on the first detection signal 31, rough detection of the rotational angle is performed mainly by determining whether the rotational angle of the steering wheel falls within an angle range of an n-th zone ("n" is a positive number), an (n−1)th zone, or an (n+1)th zone shown in FIG. 6. Further, as shown in FIG. 6, the rotating shaft 9 rotates four times while the steering wheel rotates once; therefore, four sine curves are generated in one zone.

Based on the second detection signal 32 and the third detection signal 33, voltage values Vw and Vz at a point U and a point V that intersect with each other when the above two signals are input are determined. One signal that is out of a range defined by the voltage values Vz and Vw, and the other output signal that lies within the range defined by the voltage values Vz and Vw are identified. In other words, the second detection signal 32 and the third detection signal 33 do not simultaneously fall within or out of the range defined by the voltage values Vz and Vw at any position except the intersections of the point U and the point V. Therefore, finding one of the two signals that is out of the range defined by the voltage values Vz and Vw automatically means the other signal falls within the range defined by Vz and Vw (hereinafter referred to as "Vz-Vw range"). Hence, the other signal is processed as the signal for detecting an accurate rotational angle of the steering wheel.

The microcomputer 25 then determines whether the other signal that lies in the Vz-Vw range is the second detection signal 32 or the third detection signal 33, and also determines whether the signal that is out of the Vz-Vw range is larger than the voltage value Vw or smaller than the voltage value Vz thereby to determine which one of zones h1, h2, h3, and h4 the other signal that lies in the vz-vw range belongs to. Thus, slope sections 32a, 33a, 32b, and 33b indicated by thick lines in the range "n" of FIG. 6 are obtained. The microcomputer 25 uses the slope sections 32a, 33a, 32b, and 33b of the second and third detection signals 32 and 33 to detect the accurate rotational angle of the steering wheel.

As described above, accurate realtime detection of a rotational angle of the steering wheel from the neutral position can be performed over a wide range by using the second and third detection signals 32 and 33 alternately and complementing the first detection signal 31 by the slope sections 32a, 33a, 32b, and 33b.

The first detection signal 31 can be complemented all over the area (−720° to 720° in this case) owing to the absence of a signal-free area, because the second and third detection signals 32 and 33 share the same cycle, and a phase of the second detection signal 32 and a phase of the third detection signal 33 are set so that they are shifted by a ¼ cycle. With this arrangement, an accurate rotational angle can be detected by making use of the slope sections 32a, 33a, 32b, and 33b that always exhibit large and linear changes in output voltage in relation to changes in the angle of the steering wheel. Thus, the rotational angle of the steering wheel can be detected over the entire area with high accuracy in a realtime mode. The rotational angle and direction of the steering wheel that have been detected as described above are sent from the microcomputer 25 to the control device 26 of the automobile so as to carry out detailed control of the automotive suspension, automatic transmission, etc.

Figure 10A:
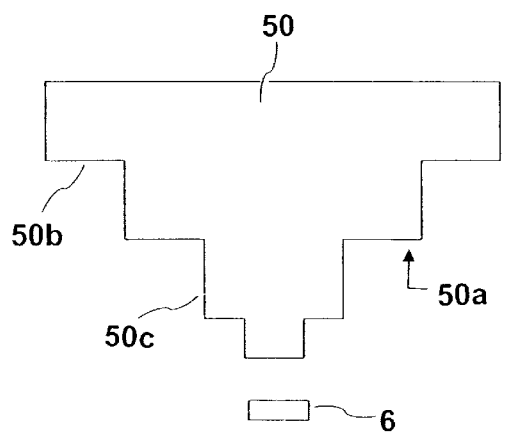
Figure 10B:
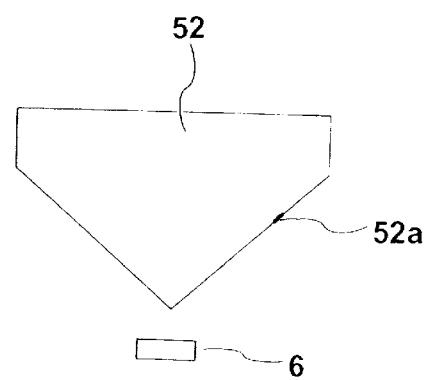
FIGS. 10B and 10C show magnets with a hill-like shape.
Figure 10C:
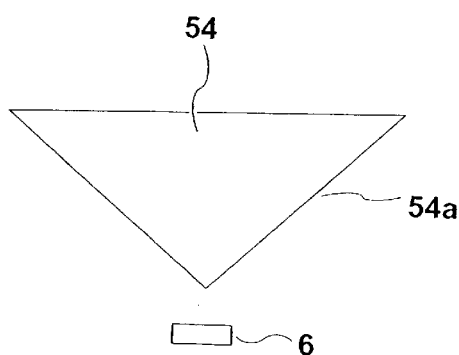

The present invention is not limited to the embodiment set forth above. The magnet 5 may have a stepped shape or a hill-like shape. One example of a magnet with a stepped shape is shown in FIG. 10A. FIG. 10A illustrates a magnet 50 having a surface opposing the Hall element 6 with two faces; a first face 50b substantially parallel with the moving direction of the magnet 50 and a second face 50c substantially orthogonal to the moving direction of the magnet 50. Examples of magnets with a hill-like shape are shown in FIGS. 10B and 10C. In both FIGS. 10B and 10C, the magnet 50 has a surface opposing the Hall element 6 with faces that are non-parallel with the moving direction of the magnet 50 (or non-parallel with the surface of the Hall element 6). Not only the surface of the magnet that opposes the Hall element 6, but a shape of an opposite surface thereof may be modified as necessary as long as linear outputs are obtained from the Hall element 6.

Thus, according to the present invention, a magnet having a shape that causes a density of magnetic fluxes to change linearly is employed. This makes it possible to obtain linear outputs at any rotational angles when a rotator is rotated, so that obtained output values can be directly processed, permitting realtime processing.

Moreover, no memory or the like for temporarily retaining detection output information is required. This helps to simplify a structure, permitting lower manufacturing cost to be achieved.

For instance, the magnetic displacement detecting device in accordance with the present invention may be attached to a steering shaft of an automobile to accurately detect angles of clockwise and counterclockwise rotations from a neutral position. Hence, based on a relationship between a rotational angle of the steering wheel and a vehicle speed at that angle, an attitude of the automobile can be controlled by controlling tightness of a suspension, a transmission gear ratio of an automatic transmission, etc.

What is claimed is:

1. A magnetic displacement detecting device comprising:
a detection member that linearly moves; and
a fixed member provided such that the fixed member opposes the detection member, the fixed member and detection member separated by a predetermined distance in a direction perpendicular with a moving direction of the detection member, one of the detection member and the fixed member being provided with a magnet having a north pole and a south pole in the moving direction of the detection member, while the other of the detection member and the fixed member being provided with a magnetic detector that faces the magnet, an opposing surface of the magnet that faces the magnetic detector increasing in distance in the perpendicular direction from the magnetic detector with increasing distance from a center of the magnet, a component of magnetic force generated from the opposing surface of the magnet in the perpendicular direction varying substantially linearly as the detection member travels in the moving direction and being detected by the magnetic detector thereby to detect an amount of movement of the detection member substantially linearly.

2. A magnetic displacement detecting device according to claim 1, wherein the opposing surface of the magnet has a radius shape.

3. A magnetic displacement detecting device according to claim 2, wherein, if a width of the magnet in the moving direction is denoted by W, a radius of the opposing surface of the magnet is denoted by R, and a thickness of the magnet in the perpendicular direction is denoted by H, then a shape proportion of the magnet has a relationship represented as W=10 to 20, H=1 to 5, and R=20 to 50.

4. A magnetic displacement detecting device according to claim 1, wherein the opposing surface of the magnet is trapezoidal.

5. A magnetic displacement detecting device according to claim 4, Wherein, if a width of the magnet in the moving direction is denoted by W, a thickness of the magnet in the perpendicular direction is denoted by H, a length of cutoffs in the H-direction of tapers at both ends of the trapezoid is denoted by Y, and a length of cutoffs in the W-direction of the tapers is denoted by X, then a shape proportion of the magnet has a relationship represented by W=10 to 20, H=1 to 5, X=4.25 to 4.75, and Y=0.4 to 0.6.

6. A magnetic displacement detecting device according to claim 1, wherein the detection member is provided with a rotator, the detection member linearly operating by a rotational operation of the rotator, and further provided with an additional detector to detect a rotational angle of the rotator with a higher resolution than that of a detection output obtained by the magnet and the magnetic detector.

7. A magnetic displacement detecting device according to claim 6, wherein the additional detector is provided along the moving direction of the detection member and separated from the magnetic detector.

8. A magnetic displacement detecting device according to claim 7, further comprising a second magnet having north and south poles in the perpendicular direction of the detection member, the additional detector detecting movement of the second magnet.

9. A magnetic displacement detecting device according to claim 8, further comprising a third detector provided along the perpendicular direction of the detection member and separated from the additional magnetic detector, the additional detector detecting movement of the second magnet.

10. A magnetic displacement detecting device according to claim 1, wherein the detection member is provided with the magnet and the fixed member is provided with the magnetic detector.

11. A magnetic displacement detecting device according to claim 1, wherein the detection member is provided with the magnetic detector and the fixed member is provided with the magnet.

12. A magnetic displacement detecting device according to claim 1, further comprising a rotator that rotates, wherein rotation of the rotator is translated into linear movement of the detection member.

13. A magnetic displacement detecting device according to claim 12, wherein the amount of movement of the detection member detected substantially linearly by the detector corresponds to a rotation of about 0-about 1440 degrees of the rotator.

14. A magnetic displacement detecting device according to claim 1, wherein the amount of movement of the detection member detected substantially linearly by the detector corresponds to about the entire range of movement of the detection member.

15. A magnetic displacement detecting device according to claim 1, wherein the opposing surface of the magnet is step-shaped.

16. A magnetic displacement detecting device according to claim 1, wherein the opposing surface of the magnet is hill-shaped.

17. A magnetic displacement detecting device according to claim 1, wherein the opposite surface of the magnet is non-parallel with the moving direction of the detecting member.

18. A magnetic displacement detecting device according to claim 1, wherein only a single magnetic detector faces the opposing surface of the magnet.

* * * * *

UNITED STATES PATENT AND TRADEMARK OFFICE
CERTIFICATE OF CORRECTION

PATENT NO.    : 6,496,003 B1
DATED         : December 17, 2002
INVENTOR(S)   : Hirofumi Okumura et al.

It is certified that error appears in the above-identified patent and that said Letters Patent is hereby corrected as shown below:

<u>Title page, Item [54] and Column 1, line 2,</u>
Delete "SERVICE" and substitute -- DEVICE -- in its place.

Signed and Sealed this

Twenty-second Day of April, 2003

JAMES E. ROGAN
*Director of the United States Patent and Trademark Office*